United States Patent [19]

Johnson

[11] 3,870,872

[45] Mar. 11, 1975

[54] PROBABILITY ANALOG FUNCTION COMPUTER

[75] Inventor: Wayne R. Johnson, Woodland Hills, Calif.

[73] Assignee: Abbott Laboratories, North Chicago, Ill.

[22] Filed: Feb. 1, 1974

[21] Appl. No.: 438,844

[52] U.S. Cl.............. 235/197, 235/193, 235/151.13

[51] Int. Cl.............................................. G06g 7/26

[58] Field of Search ...... 235/197, 193, 184, 151.13, 235/151.3, 151.35

[56] References Cited

UNITED STATES PATENTS

| | | | |
|---|---|---|---|
| 3,124,678 | 3/1964 | Masonson | 235/197 |
| 3,205,454 | 9/1965 | Lowe | 235/197 |
| 3,544,774 | 12/1970 | Peklenik | 235/197 X |
| 3,549,877 | 12/1970 | Goldman | 235/151.13 X |
| 3,668,380 | 6/1972 | Claxton | 235/197 |

*Primary Examiner*—Joseph F. Ruggiero
*Attorney, Agent, or Firm*—Jessup & Beecher

[57] ABSTRACT

A probability analog function computer is provided which has a pseudo Gaussian distribution function curve adjustable along a voltage coordinate axis to a selected probability voltage location and having its 2-sigma value adjustable to any desired width. The pseudo Gaussian distribution function curve is achieved in the computer by combining the transfer functions of two solid state differential amplifier circuits.

6 Claims, 4 Drawing Figures

PROBABILITY ANALOG FUNCTION COMPUTER

BACKGROUND OF THE INVENTION

The field of knowledge which is concerned with statistics, that is with the collecting, analyzing and presentation of data, may be regarded as an application of the probability theory. Statistical methods are employed to assess the magnitude of random variations, and to minimize and to balance out such random variations. The theory of probability is concerned with the properties of random variables and, therefore, furnishes the basis for developing techniques for their control.

Statistical methods may also be utilized for deriving information about populations by observing samples of the populations. A population may be defined as any well-specified collection of elements, and it may be infinite or finite. An element of a univariate population is characterized by the value of a random variable which measures some single attribute of interest in the population. Random variables are either continuous, which means they can take on any numerical value; or discrete, which means they can take on only a restricted set of values.

In a univariate population, the population distribution function is a curve which is a function of the random variable which characterizes the elements of the population, and from which one can determine the proportion of the population which has elements in a certain range of the random variable. Population distributions are often specified incompletely by certain population parameters. Some of these parameters are location parameters, or measures of central tendency, and a second class of important parameters consists of measures of dispersion or scale parameters.

If one examines every element of a population and records the value of the random variable for each, then he has complete information about the distribution of the random variable in the population, and there is no statistical problem. However, it is usually impossible or uneconomical to make a complete enumeration, or census, of a population, and one must therefore be content to examine only a part or sample of the population. On the basis of the sample, one may draw conclusions about the entire population. The conclusions thus drawn are not certain in the sense that they would have likely been somewhat different if a different sample of the population had been examined.

The problem of drawing valid conclusions from samples and of specifying their range of uncertainty is known as the problem of statistical inference. Many important sampling distributions are derived for random samples drawn from a normal or Gaussian distribution, which is a bell-shaped symmetrical distribution curve centered about its means value. As described briefly above, the probability analog function computer of the present invention synthesizes a pseudo Gaussian distribution function curve which is adjustable along a voltage coordinate axis to any selected probability Gaussian reference voltage, and whose 2-sigma value is also adjustable.

The probability analog function computer of the invention has utility in a system which provides, for example, a multiplicity of feature vectors, each represented by a different multi-bit binary signal, and each corresponding to a different random variable in the population being analyzed.

For example, the probability analog function computer of the invention has particular utility in a system for the automatic analysis of blood cells. Blood cells have been analyzed by computers in the past, but this has been done by the use of expensive general purpose digital computers. By the use of the probability analog function computer of the present invention, such an analysis may be carried out quickly and efficiently, and by means of a relatively simple and low cost system.

In such a system, information about the blood cells is generated by means of a high resolution flying spot scanner which has special sweep circuits controlled by a computer. The resulting video signals derived from the scanner are then processed in a hybrid analog/digital special purpose computer. The result is a plurality of different multi-bit digital signals, each signal corresponding to a different feature vector of the blood cells being analyzed. For example, one digital signal may represent the edge roughness of the nuclei, another feature vector may represent a precise measurement of the maximum dimensions of the nuclei, another feature vector may represent the circularity of the cell, and so on.

The resulting feature vectors may then be stored in digital registers and held until the end of a scanning function. The information may then be processed in a multiplicity of probability analog function computers, each constructed to incorporate the concepts of the invention, and each having a probability Gaussian reference voltage which is adjustable, and a 2-sigma value which also is adjustable.

The settings of potentiometers in each probability analog function computer to determine its probability Gaussian reference voltage and the 2-sigma value of its Gaussian distribution curve may be set either manually or by computer means. The digital signals representing the different feature vectors are then transformed into corresponding different analog voltages, each corresponding to a different one of the pre-set probability analog function computers of the invention.

The output of each probability function computer may than be summed in an operational amplifier, and the output of the amplifier may be fed to an amplitude comparator with a set reference voltage. The comparator will indicate that a particular cell, whose composition is identified by the various feature vectors, has been recognized. The number of recognitions may then be counted in a binary counter and displayed on a three or four digit meter, or the information may be printed by an appropriate printer.

It is to be understood, of course, that the foregoing recognition system represents merely one application of the probability analog function computer of the invention. In such a system it is used to replace the digital computers of the prior art recognition systems in which each feature vector is analyzed separately. The improved analog function computer of the present invention, as will be described in more detail, may be used in such a recognition system to respond to all the feature vectors of a particular item at once, and quickly and simply to recognize whether the item exists, and the quantities of the item which are present.

This is achieved in the analog function computer of the invention by synthesizing a pseudo Gaussian curve by analog means. Although Gaussian curves have been synthesized in the past by digital means, such a digital synthesis is complex, and it requires complicated and expensive machinery. As indicated above, the computer of the present invention combines two transfer functions of a pair of solid state differential amplifiers so as to provide an analog memory having the desired Gaussian-like characteristics.

DETAILED DESCRIPTION OF THE ILLUSTRATED EMBODIMENT

Figure 1:
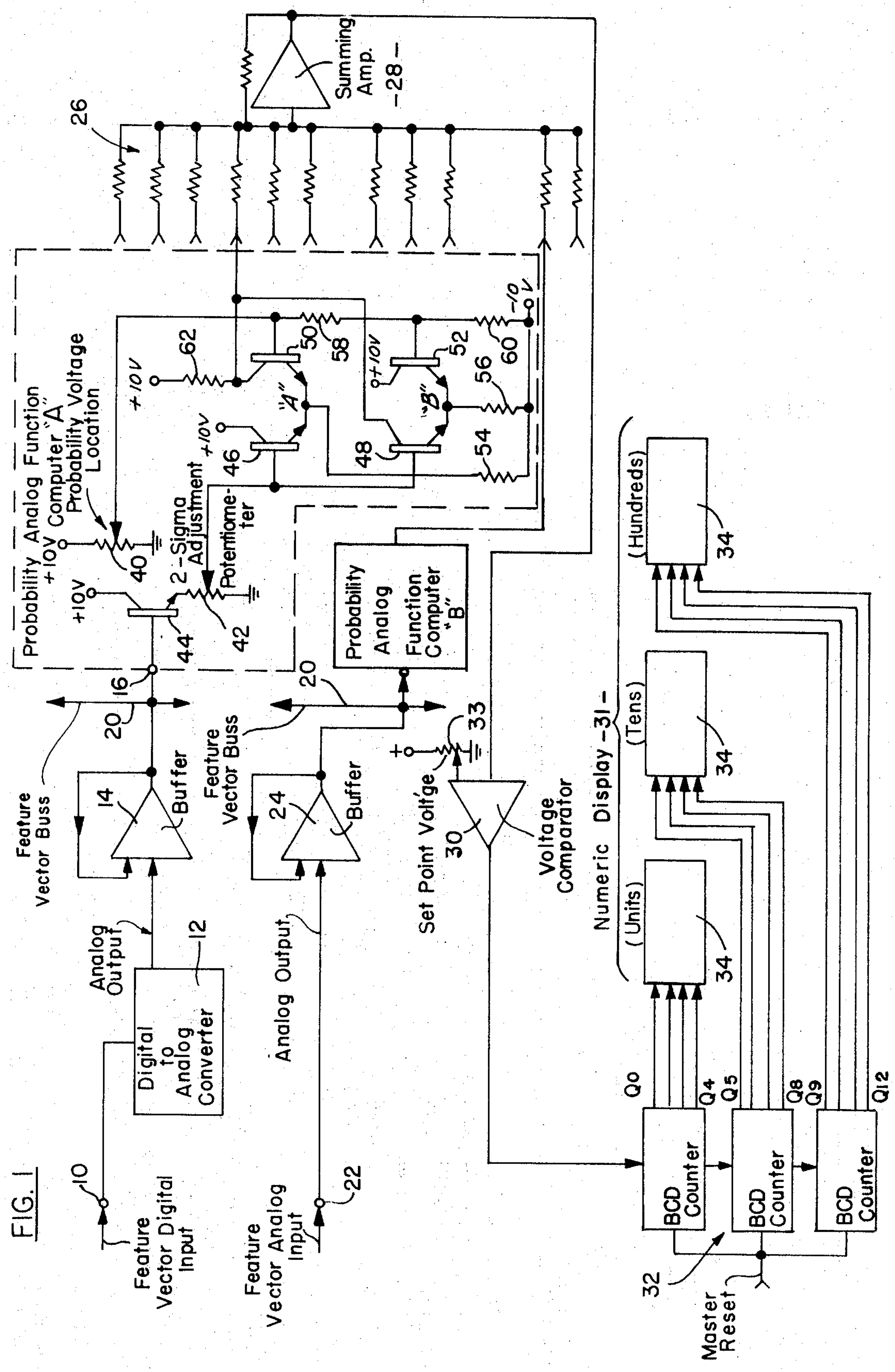
FIG. 1 is a recognition system which includes a multiplicity of probability analog function computers, each incorporating the concepts of the invention; the system being used to identify the probable number of a selected item existing in a population, as based on the processing of feature vectors in the form of analog voltages repesentative of various features of the particular item.

In the system shown in FIG. 1, for example, a digital input corresponding to a particular feature vector of the item being scanned is applied to an input terminal 10 which, in turn, is connected to a digital/analog converter 12, so that the digital input may be converted into a corresponding analog output which has a voltage representative of the particular feature vector.

The resulting analog output is translated by a buffer amplifier 14 and applied to the input terminal 16 of a probability analog function computer "A" which is constructed to incorporate the concepts of the present invention. Other analog feature vector voltages are also applied to the input terminal 16 by way of a bus 20, and the feature vector voltage from the buffer amplifier 14 is also applied to other probability analog function computers by an appropriate bus.

The analog function computer "A" includes a potentiometer 40 which is adjusted, by computer or other means, to a value such that the probability analog function computer "A" will respond only to a particular feature vector analog voltage applied to its input terminal 16, and voltages in its vicinity. The probability analog function computer "A" also includes a second potentiometer 42 which is also adjusted by computer, or other means, to determine the range of analog voltages in a Gaussian distribution function, and extending on both sides of the particular feature vector voltage which will also be accepted by the computer.

A second feature vector voltage may be applied to the input terminal 22, and translated by a buffer 24 to the feature vector bus 20 and to a second probability analog function computer "B," which may be of the same circuit design as the probability function analog computer "A." The second analog feature vector voltage is also applied to the probability analog function computer "A," and to a multiplicity of other like analog function computers.

Each of the analog function computers is connected to a separate input of a summing network 26, the output of which is passed through an operational summing amplifier 28 to a voltage comparator 30. The resulting output is compared with a set point reference voltage in the voltage comparator, the set point reference voltage being established by setting a potentiometer 33. The output of the comparator 30 is applied to a binary coded digital counter 32 which, in turn, controls a typical numeric display 34.

Therefore, the various signals which describe the particular item being identified are supplied to the system of FIG. 1. Any of these signals which are of a digital nature are converted into corresponding analog voltages. The system includes a plurality of probability analog function computers which are set to respond to the various analog voltages, and each of which has a Gaussian function distribution curve set at a desired 2-sigma width.

The output of each probability function computer is summed simultaneously in the network 26 and summing amplifier 28, and the output of the amplifier is fed to the voltage comparator 30 where it may be compared with a predetermined set point reference voltage. When the voltage has been exceeded, the comparator will indicate that the item has been recognized, and the resulting pulse output from the voltage comparator is fed to the counter 32.

Each time the item is recognized, the voltage comparator 30 generates a pulse, and the resulting pulses are counted in the counter 32, and the resulting output from the counter controls a typical numeric display, such as the display 31. The display permits the information to be displayed on a 3 to 4 digit panel meter. As an alternative, the information may be printed out by an appropriate printer.

The present invention is actually concerned with the composition and circuitry of the probability analog function computers which are shown as incorporated into the system of FIG. 1. The probability analog function computer "A" is shown in circuit detail, and other probability analog function computers utilized in the system may have the same composition.

The probability analog computer "A" includes an NPN transistor 44 which is connected as an emitter follower, and whose collector is directly connected to the positive exciting voltage source, and whose emitter is connected to ground through the 2-sigma width control potentiometer 42. The moving contact of the potentiometer 42 is connected to the base of an NPN transistor 46 and to the base of an NPN transistor 48. The moving contact of the potentiometer 40 is connected to the base of an NPN transistor 50, and through an unbalancing 200 ohm resistor 58 to the base of an NPN transistor 52.

The emitters of the transistors 46 and 50 are connected to the negative terminal of a 10-volt direct voltage source through a 100 kilo-ohm resistor 54, and the emitters of the transistors 48 and 52 are connected to that teterminal through a 100 kilo-ohm resistor 56. The base of the transistor 52 is connected to the negative terminal through a 1 megohm resistor 60. The collectors of the transistors 46 and 52 are directly connected to the positive terminal of the 10-volt source, and the collectors of the transistors 48 and 50 are connected through a resistor 62 to the positive terminal.

Figure 2:
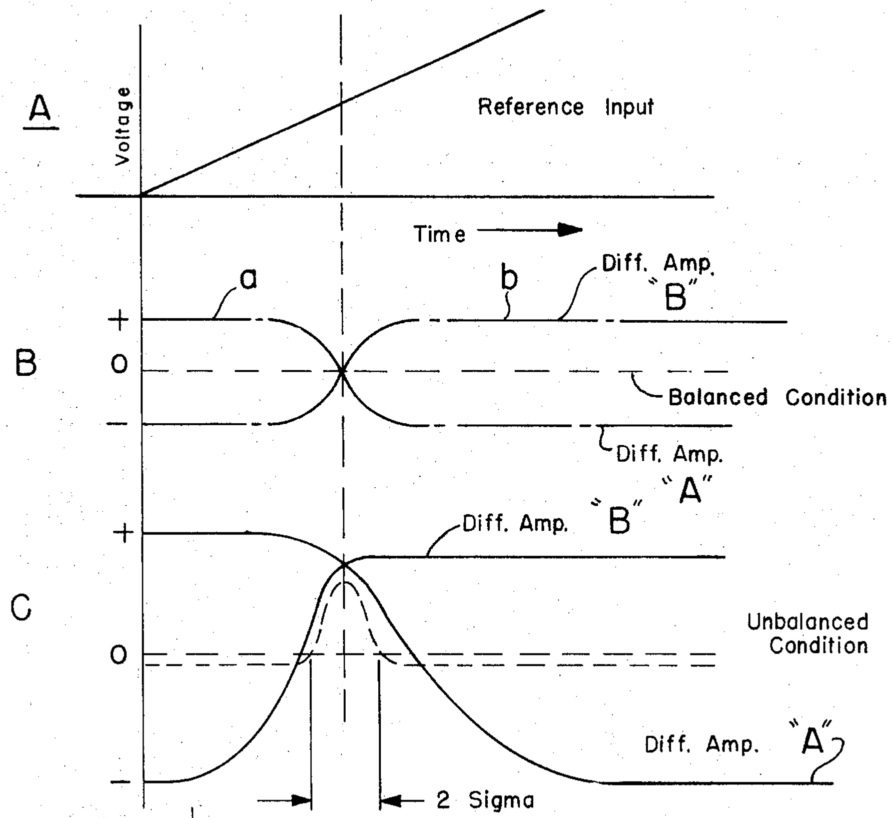
FIG. 2 is a series of curves illustrating the manner in which the probability analog function computer of the invention combines certain transfer characteristics to synthesize a pseudo Gaussian distribution function curve.

The transistors 46 and 50 are connected as a differential amplifier "A," and as an increasing voltage, as shown by the curve of FIG. 2A appears, for example, across the potentiometer 42. The output across the resistor 62 due to the differential amplifier "A" is represented by the curve *a* of FIG. 2B. Likewise, the output appearing across the resistor 62 from the differential amplifier "B" formed by the transistors 48 and 52 is as represented by the curve *b* in FIG. 2B.

When the differential amplifiers "A" and "B" are balanced, as represented by the curves of FIG. 2B, the two outputs cancel one another across the resistor 62, so that there is no resulting output. However, the introduction of the resistor 58 in the circuit unbalances the two differential amplifiers, so that the cross-over point of their transfer function curves is shifted, as shown by the curves of FIG. 2C, so that a resulting output appears across the resistor 62 which approximates the Gaussian distribution function curve. The potentiometers 40 and 42 may be controlled so that the resulting Gaussian distribution curve of FIG. 2C centers at any selected voltage value, and also so that the 2-sigma width of the curve may have any desired value.

Figure 3:
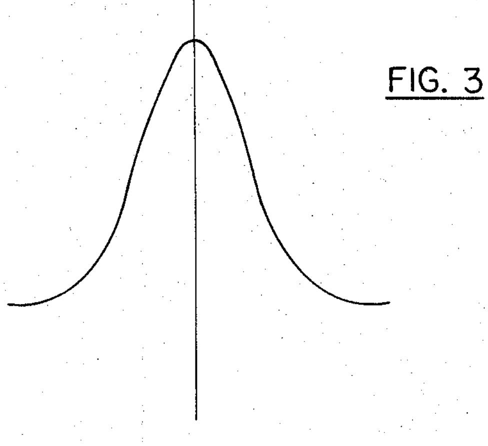
FIG. 3 is a representation of typical pseudo Gaussian distribution function curve corresponding to a particular 2-sigma setting of the computer.
Figure 4:
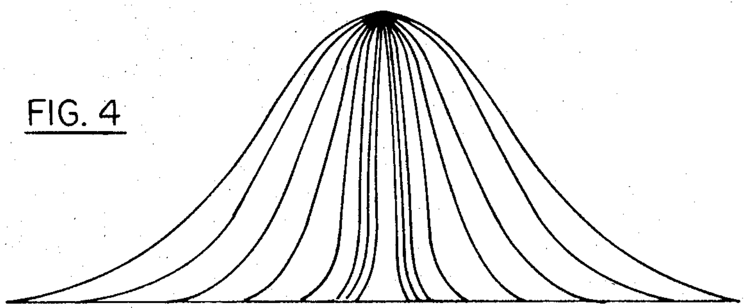
FIG. 4 is a representation of a family of pseudo Gaussian distribution function curves corresponding to different 2-sigma settings.

As mentioned above, FIG. 3 is a representation of the Gaussian distribution function curve corresponding to a particular setting of the potentiometers 40 and 42. FIG. 4, on the other hand, is a family of curves showing different settings of the potentiometers to achieve different 2-sigma widths. It is clear that the distribution function curve can be adjusted from a value at which the probability analog function computer will respond only to voltages corresponding to a particular analog voltage input, and a value at which the probability computer will respond not only to voltages exactly equal to the analog voltage input, but other voltages approximating that voltage input in accordance with the Gaussian distribution function.

The invention provides, therefore, an improved probability computer which operates on analog principles, and which approximates the Gaussian distribution function curve. The improved probability computer of the invention is simple in its circuitry, and capable of simple adjustments, as explained above. Moreover, the probability computer lends itself to a system for the simultaneous evaluation of a plurality of feature vectors for the instantaneous recognition of items in a population.

While a particular embodiment of the invention has been shown and described, modifications may be made. It is intended in the claims to cover all modifications which fall within the spirit and scope of the invention.

What is claimed is:

1. A probability analog function computer comprising: an input circuit for receiving input analog voltages; a first differential amplifier circuit connected to said input circuit for producing in accordance with a first transfer function curve a negative-going output signal in response to analog input voltages below a predetermined reference voltage and a positive-going output signal in response to analog input voltages above said predetermined reference voltage; a second differential amplifier circuit connected to said input circuit for producing in accordance with a second transfer function curve a positive-going output signal in response to analog input voltages below said predetermined reference voltage and a negative-going output signal in response to analog input voltages below said predetermined reference voltage; a common output circuit connected to said differential amplifiers; an unbalancing impedance means interconnecting said differential amplifiers for displacing the cross-over point of said first and second transfer function curves to enable said output circuit to produce output signals in the vicinity of said cross-over point in accordance with an approximate Gaussian distribution function curve; means connected to said differential amplifiers for establishing a selected 2-sigma width for said Gaussian distribution function curve; and means connected to said differential amplifiers for establishing a selected value for said predetermined reference voltage.

2. The probability analog function computer defined in claim 1, and which includes a potentiometer included in said means connected to said differential amplifiers for establishing different selected values for said predetermined reference voltage.

3. The probability analog function computer defined in claim 1, in which said means for controlling the 2-sigma width of said Gaussian distribution function curve includes a potentiometer for establishing different 2-sigma widths thereof.

4. A probability analog function computer comprising: an input circuit for receiving input analog voltages; a first differential amplifier circuit connected to said input circuit for producing in accordance with a first transfer function curve a negative-going output signal in response to analog input voltages below a predetermined reference voltage and positive-going output signal in response to analog input voltages above said predetermined reference voltage; a second differential amplifier circuit connected to said input circuit for producing in accordance with a second transfer function curve a positive-going output signal in response to analog input voltages below said predetermined reference voltage and a negative-going output signal in response to analog input voltages below said predetermined reference voltage; a common output circuit connected to said differential amplifiers; an unbalancing impedance means interconnecting said differential amplifiers for displacing the cross-over point of said first and second transfer function curves to enable said output circuit to produce output signals in the vicinity of said cross-over point in accordance with an approximate Gaussian distribution function curve; and potentiometer means connected to said first and second differential amplifiers for establishing preset values for said predetermined reference voltage.

5. A probability analog function computer comprising: an input circuit for receiving input analog voltages; a first differential amplifier circuit connected to said input circuit for producing in accordance with a first transfer function curve a negative-going output signal in response to analog input voltages below a predetermined reference voltage and a positive-going output signal in response to analog input voltages above said predetermined reference voltage; a second differential amplifier circuit connected to said input circuit for producing in accordance with a second transfer function curve a positive-going output signal in response to analog input voltages below said predetermined reference voltage and a negative-going output signal in response to analog input voltages below said predetermined reference voltage; a common output circuit connected to said differential amplifiers; an unbalancing impedance means interconnecting said differential amplifiers for displacing the cross-over point of said first and second transfer function curves to enable said output circuit to produce output signals in the vicinity of said cross-over point in accordance with an approximate Gaussian distribution function curve; and potentiometer means included in said input circuit for controlling the 2-sigma width of said Gaussian distribution function curve.

6. A probability analog function computer comprising: an input circuit for receiving input analog voltages; a first differential amplifier circuit formed of solid state transistor elements and connected to said input circuit for producing in accordance with a first transfer function curve a negative-going output signal in response to analog input voltages below a predetermined reference voltage and positive-going output signal in response to analog input voltages above said predetermined reference voltage; a second differential amplifier circuit formed of solid state transistor elements and connected to said input circuit for producing in accordance with a second transfer function curve a positive-going output signal in response to analog input voltages below said predetermined reference voltage and a negative-going output signal in response to analog input voltages below said predetermined reference voltage; a common output circuit connected to said differential amplifiers; and an unbalancing impedance means interconnecting said differential amplifiers for displacing the cross-over point of said first and second transfer function curves to enable said output circuit to produce output signals in the vicinity of said cross-over point in accordance with an approximate Gaussian distribution function curve.

* * * * *